(No Model.)
T. F. COLIN.
PROCESS OF OBTAINING CHLORINE COMPOUNDS FROM NATURAL GAS.
No. 427,744. Patented May 13, 1890.
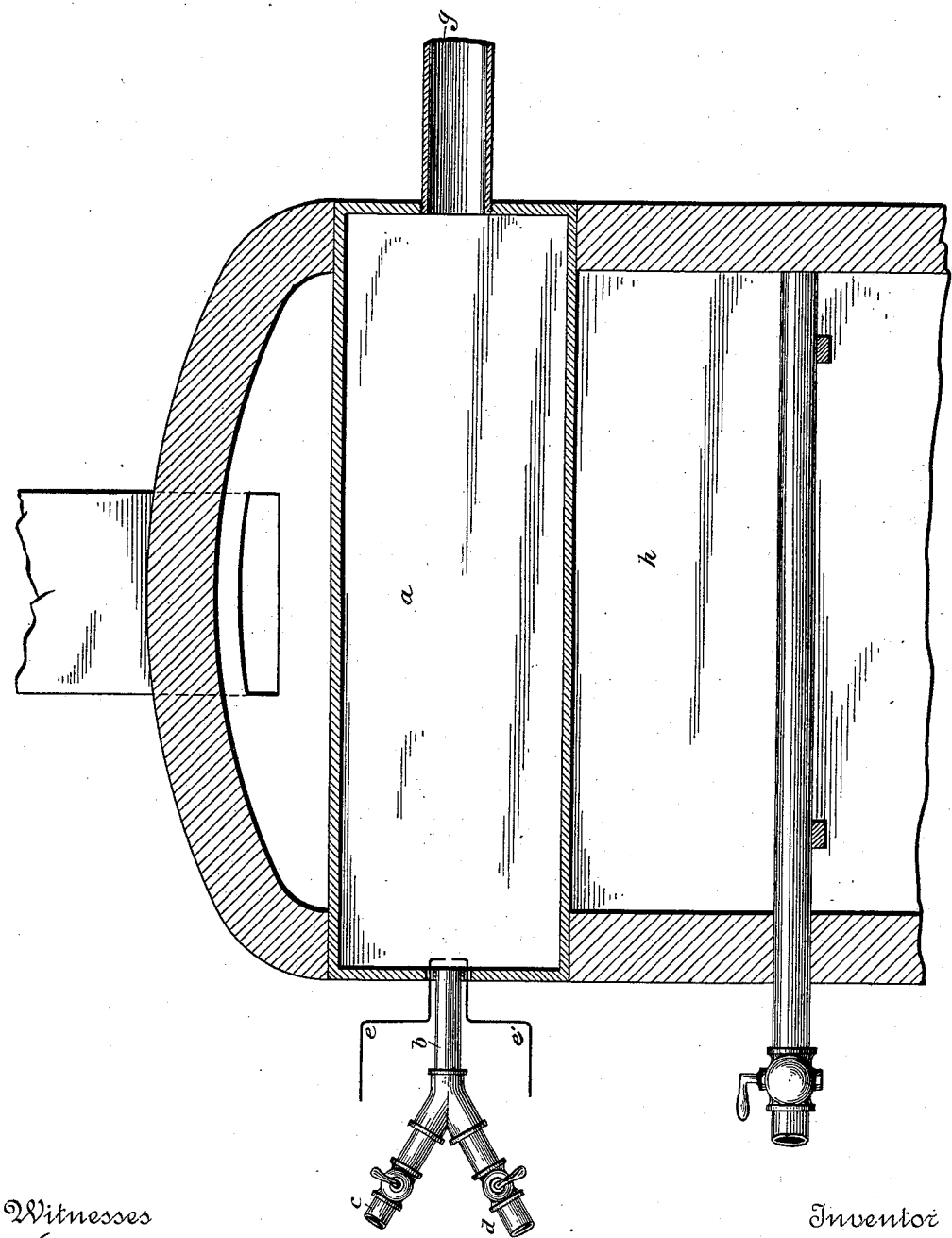

UNITED STATES PATENT OFFICE.

THEODORE F. COLIN, OF PITTSBURG, PENNSYLVANIA, ASSIGNOR OF THREE FOURTHS TO LEVI SHOOK AND JAMES BISHOP, OF SAME PLACE, AND T. J. VANDERGRIFT, OF JAMESTOWN, NEW YORK.

PROCESS OF OBTAINING CHLORINE COMPOUNDS FROM NATURAL GAS.

SPECIFICATION forming part of Letters Patent No. 427,744, dated May 13, 1890.

Application filed July 1, 1889. Serial No. 316,249. (No model.)

*To all whom it may concern:*

Be it known that I, THEODORE F. COLIN, a resident of Pittsburg, in the county of Allegheny and State of Pennsylvania, have invented a new and useful Improvement in Process of Forming Chlorides of Marsh-Gas; and I do hereby declare the following to be a full, clear, and exact description thereof.

My invention relates to the manufacture of combinations of chlorine and the hydrocarbon known as "methane"—*i. e.*, the methyl chlorides, chlormethane, dichlormethane, and chloroform, these bodies having, as is well known, certain desirable properties, and being used in chemical arts, in medicine, and for manufacturing purposes.

The object of my invention is to utilize in the manufacture of these products what is known as "natural gas," which is obtained in large quantities from Artesian wells, and may be considered practically as marsh-gas, or methane, containing, in some cases, about ninety-five per cent. of marsh-gas. A material for the manufacture of these methyl chlorides thus offers itself at low cost, and my invention supplies a process for their production in large quantities and cheaply from natural gas.

It consists, generally stated, in forming the methyl chlorides by burning the chlorine and natural gas in proper proportions within a suitable chamber, so forming a methyl chloride and hydrogen chloride, washing the latter out of this mixture and separating the chloride of marsh-gas from the chloride of any of its higher homologues or of any olefiants (occurring in the natural gas in small quantities) through condensation of these by cooling and subsequent liquefaction of chlormethane by pressure; or, in the case of chloroform, fractional condensation, with subsequent further distillation, is used to obtain it free from other chlorides. The combustion of chlorine and marsh-gas is induced and kept up by an electric spark. The combustion-chamber has to be kept at a proper temperature to facilitate the reaction inside, considering also that too high a temperature will favor dissociation of the products formed.

To enable others skilled in the art to understand my invention, I shall describe it more fully, referring to the accompanying drawing, which shows a suitable retort for practicing my invention.

In the first place, the chlorine is produced and stored in any suitable manner at present developed, the two gases being in separate holders, made of a material suitable to each of them. They are drawn from these holders and forced by a blower in suitable proportions into a chamber or retort of suitable material and size, where they come in contact, mix, and are ignited. This chamber can be kept at a temperature of 100° to 200° centigrade by an external source of heat, if used to produce chloroform, the reaction not developing heat enough to maintain itself, and the electrical resistance of the chlorine and chlorine products being so high that the spark cannot pass unless helped by external heat. In the case of chlormethane the combustion-chamber has to be cooled by the free passage of air around it, to prevent a conversion of a part of the marsh-gas into its final products with chlorine—namely, $CCl_4$ and HCl—there being a considerable development of heat in this case.

The proportions of the two gases necessary to form the different methyl chlorides are to one volume of marsh-gas one volume of chlorine to produce chlormethane, two volumes to produce dichlormethane, and three volumes to produce chloroform.

The different reactions are represented as follows:

To produce chlormethane, ($CH_4 + Cl_2 = CH_3Cl + HCl$:) One volume of chlorine combines with one volume of marsh-gas and produces chlormethane and hydrogen chloride, one atom of chlorine replacing one atom of hydrogen in the marsh-gas, while the other atom combines with the liberated one atom of hydrogen to one molecule of hydrogen chloride. By passing the resultant gaseous mixture through washing-jars or coke-towers, as is done in the ordinary production of muriatic acid, the hydrogen chloride is absorbed by water and is reused for the further production of chlorine. The natural gas always containing more or less of heavier hydrocarbons besides methane, there are also formed other chlorides, which are separated by passing the gaseous mixture after removing the hydrogen chloride through any suitable condenser, cooled by a current of water, where they liquefy and leave chlormethane, which is further passed through a solution of caustic soda or carbonate, in order to remove all traces of hydrogen chloride, next dried by means of sulphuric acid, and finally compressed by a pump at three to five atmospheres into suitable iron cylinders.

If the mixing of the two gases in the combustion-chamber is thorough, there will be no higher chlorides of marsh-gas present; but as in practice on a large scale such a thorough mixture is impossible, some of these will be also formed; but by good work the amount of these can be kept down to a very low percentage, and their boiling-points being so far apart they will condense in the washing and cooling apparatus. Any traces of them absorbed by the liquid chlormethane will not interfere at all with the uses to which it is to be applied.

To produce dichlormethane after the following reaction: $CH_4 + 2Cl_2 = CH_2Cl_2 + 2HCl$: One volume of marsh-gas requires two volumes of chlorine, and the working of the process is the same as for chlormethane.

Chloroform is produced from one volume of marsh-gas with three volumes of chlorine, as follows: $CH_4 + 3Cl_2 = CHCl_3 + 3HCl$. The method of working is the same, except that the reaction needs to be supported by heating the combustion-chamber externally by heat obtained from an independent source. After washing out the hydrogen chloride from the mixture of resultant gases they are passed through a cooler to condense, and the chloroform is afterward rectified by fractional distillation, in which the part coming over at 61° to 62° centigrade only is collected as commercial chloroform. In order to induce and maintain the combustion of the two gases in all these cases, I use an electric spark, passing within the chamber between properly-insulated wires communicating with a proper source of an electric current. I find, also, that this current must be of a proper tension, varying with the conditions of distance between the poles, temperature, pressure, and velocity of the gas, a weak one not being able to overcome the resistance of the gas inside, while one too strong would produce a dissociation of a part of the newly-formed compounds.

Natural gas as found in some localities being nearly all marsh-gas, it offers the cheapest material possible for the production of those simpler bodies containing the radical methyl ($CH_3$) in combination with chlorine. By my process I can produce them at low cost and in enormous quantities, thus supplying the present demand for them and also extending their use considerably.

Apparatus suitable for practicing my invention is shown in the accompanying drawing, in which $a$ is the retort or chamber and $b$ the inlet-pipe at one end thereof, into which lead the pipes $c$ and $d$, communicating with the gas-holders containing the chlorine and natural gas. At the sides of the inlet-pipe $b$ are wires $e$ and $e'$, passing through tubes of porcelain or other insulating material, and terminating in such position that the spark passing between them will ignite the gases. At the other end of the retort is the outlet-pipe $g$, leading to the washing-jars. The retort may be built in a suitable furnace $h$ and maintained thereby at the proper heat when necessary, such as in making chloroform.

What I claim as my invention, and desire to secure by Letters Patent, is—

1. The herein-described process of forming chlorides of marsh-gas, consisting in causing the mutual combustion of chlorine and natural gas or methane by burning them within a chamber or retort, substantially as and for the purposes set forth.

2. The herein-described process of forming chlorides of marsh-gas, consisting in causing the mutual combustion of chlorine and natural gas or methane by burning them within a chamber or retort, absorbing the hydrogen chloride from the resultant gas, and liquefying the methyl chlorides, substantially as and for the purposes set forth.

3. The herein-described process of forming chlorides of marsh-gas, consisting in causing the mutual combustion of chlorine and natural gas or methane in a chamber or retort, absorbing the hydrogen chloride from the resultant gas, and compressing the chlormethane to liquefy the same, substantially as and for the purposes set forth.

4. The herein-described process of forming chlorides of marsh-gas, consisting in mixing chlorine and natural gas or methane within a chamber or retort, maintaining the chamber at a proper temperature and burning the said gases therein, substantially as and for the purposes set forth.

5. The herein-described process of forming chlorides of marsh-gas, consisting in mixing chlorine and natural gas or methane within a chamber or retort, and igniting the gases and keeping up the reaction thereof by an electric spark of proper tension, substantially as and for the purposes set forth.

6. The herein-described process of forming chlorides of marsh-gas, consisting in mixing chlorine and natural gas or methane within a chamber or retort, maintaining the chamber at a proper temperature, igniting the gases and keeping up the reaction by an electric spark of proper tension, absorbing out the hydrogen chloride formed, and then liquefying the methyl chlorides, substantially as and for the purposes set forth.

In testimony whereof I, the said THEODORE F. COLIN, have hereunto set my hand.

THEODORE F. COLIN.

Witnesses:
J. N. COOKE,
J. WM. BOWMAN.